United States Patent [19]

Liu

[11] Patent Number: 4,793,694
[45] Date of Patent: Dec. 27, 1988

[54] METHOD AND APPARATUS FOR LASER BEAM HOMOGENIZATION
[75] Inventor: Kuo-Ching Liu, Setauket, N.Y.
[73] Assignee: Quantronix Corporation, Smithtown, N.Y.
[21] Appl. No.: 856,631
[22] Filed: Apr. 23, 1986
[51] Int. Cl.$^4$ .............................................. G02B 27/16
[52] U.S. Cl. ............................... 350/379; 219/121.75; 350/170
[58] Field of Search .............. 350/170, 172, 403, 616, 350/618, 622, 171, 174, 169, 613–614, 619–620, 622, 504–505, 445, 433; 219/121 LP, 121 LQ, 121 LR; 372/9, 25, 99

[56] References Cited
U.S. PATENT DOCUMENTS

| 2,733,632 | 2/1956 | Pall ..................................... 350/170 |
| 2,894,427 | 7/1959 | Sabater ................................ 350/170 |
| 3,941,973 | 3/1976 | Luck, Jr. et al. ............. 219/121 LR |
| 4,315,130 | 2/1982 | Inagaki et al. ................ 219/121 LQ |
| 4,370,026 | 1/1983 | Dubroeucq et al. ................ 350/170 |
| 4,475,027 | 10/1984 | Pressley ......................... 219/121 LP |
| 4,630,274 | 12/1986 | Schafer ................................. 372/25 |

FOREIGN PATENT DOCUMENTS 166389  9/1984  Japan ........................... 219/121 LQ Primary Examiner—John K. Corbin
Assistant Examiner—Martin Lerner
Attorney, Agent, or Firm—Kane, Dalsimer, Sullivan, Kurucz, Levy, Eisele and Richard

[57] ABSTRACT

A light beam with non-uniform cross-sectional intensity profile is positioned into a central portion and two side lobes and the two side lobes are folded over the central portion to form a concentrated beam at a focus plane having substantially uniform intensity profile. The partitioning and folding may be done by mirror pairs disposed along the axis of the beam, or a trapezoidal prism.

9 Claims, 3 Drawing Sheets

METHOD AND APPARATUS FOR LASER BEAM HOMOGENIZATION

BACKGROUND OF THE INVENTION

1. Field of the Invention

This invention pertains to a method and device for generating a laser beam with uniform cross-section from a laser beam having either a Gaussian or a high order transverse mode intensity distribution.

2. Description of the Prior Art

There are many laser applications that required a uniform light intensity distribution on a unique focal plane. Some examples are photolithographic mask exposure, semiconductor laser annealing, laser etching, photographic scanning, laser illumination, data processing and many laser machining applications. However, the lasers' spatial intensity profile is typically either a $TEM_{00}$ mode with Gaussian distribution or a high order transverse mode with no well-defined analytical distribution but a relatively uniform center and sloping edges.

Many techniques have been proposed in the literature to provide some forms of modification for these laser beam profile distributions. An aspheric mirror pair was patented to Kreuger in U.S. Pat. No. 3,476,463 to deviate a well-defined Gaussian profile to a more uniform intensity distribution. Two afocal doublet lenses were proposed by Shafer in "Gaussian to flat-top intensity distribution lens" Optics and Laser Technology, pg. 159, 1982, using a similar concept and method. The major shortcoming of the above two methods is their restriction to an incident Gaussian laser beam profile of fixed diameter. A more general method has been reported by M.R. Latta and J. Jain of IBM in "Beam-intensity uniformization by mirror folding" Optical Soc. of America 1983 Annual Meeting, Technical program pg. 43. This technique folds the incident laser beam onto the center portion of itself with a focusing lens and a wedge mirror tunnel. The shortcomings of this method are threefold. First, it requires a strong focus point on the very front end of the reflector tunnel in order to form the folding which is undesirable in high power applications; second, the interference effect between the folded components, particularly for a $TEM_{00}$ mode or other highly coherent laser beam can produce large intensity variations; and third, the system is very sensitive to the wedge angles and positions of the wedge mirrors and an additional recollimating mirror is required.

OBJECTIVES AND SUMMARY OF THE INVENTION

An objective of the present invention is to provide a method and apparatus for laser beam homogenization which is self-compensatory for cross-sectional variations in the beam.

Another objective is to provide a method and system wherein any optical absorption losses are minimized thereby maximizing the throughput of the apparatus.

A further objective is to provide a method and device wherein optical interference effects between superimposed beam sections are eliminated.

Yet another objective is to provide a single method and apparatus which can be used to homogenize and concentrate a $TEM_{00}$ mode beam, a multimode beam or even a highly-distorted beam.

A further objective is to provide a method and apparatus which does not require any lenses and is simple and inexpensive to construct.

Other objectives and advantages shall become apparent from the following description of the invention. The purpose of the subject invention is to concentrate a laser beam having a non-uniform cross-sectional distribution. The beam may have a square or rectangular cross-section. Two lateral lobes of the beam comprising the decaying portions of the incoming beam are separated from a central portion of the beam by the first set of dual mirrors. The two lobes are then superimposed on the central portion along "opposite" edges thereof from the second set of dual mirrors. The device comprises means for separating the lobes from the central portion, and means for superimposing the lobes on the central portion on a unique focus plane.

Another set of mirrors may be used to fold the beam in a second cross-sectional direction orthogonal to the first direction. This second set operates on the lobes in the same manner as the first set.

DETAILED DESCRIPTION OF THE INVENTION

Figure 1:
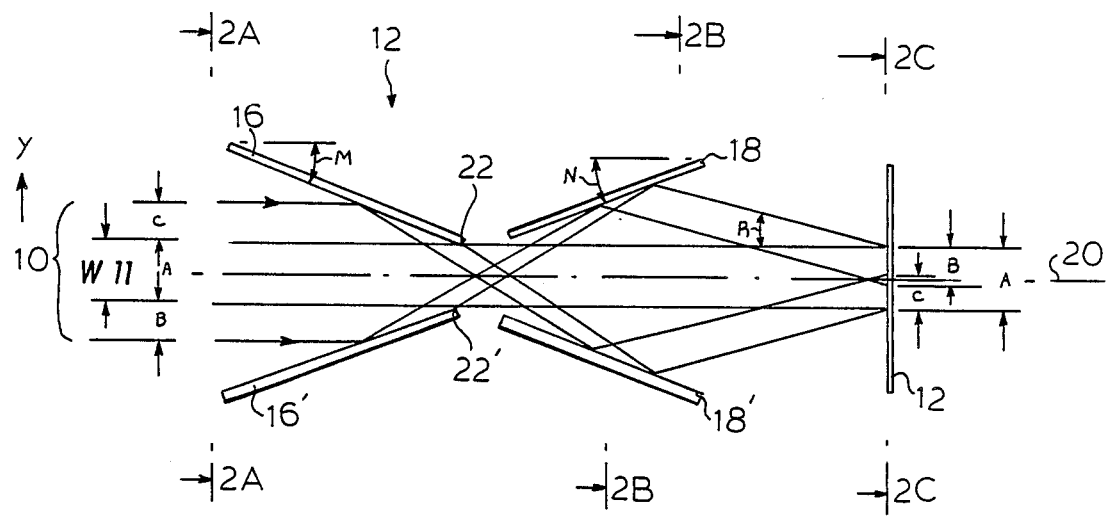
FIG. 1 shows a schematic sideview of a laser beam being concentrated by the method and apparatus of the present invention.

FIGS. 1–4 show by way of illustration some preferred embodiments of the invention. Referring to FIG. 1, a laser beam 10 is directed at a plane 12, at which plane, a laser beam of cross-sectional dimension W11 is required having a uniform intensity distribution in the Y dimension. The laser beam 10 has a generally-asymmetric bell-shaped distribution along cross-sectional direction Y, as shown in FIG. 2A. Thus at $Y = \pm W/2$, the curve has two different intensities $I_1$, $I_2$ which are not equal. For example, as shown in FIG. 2A, $I_1$ is greater than $I_2$.

The device 12 is provided to concentrate beam 10 and it comprises two pairs of mirrors 16,16' and 18,18' respectively. Mirrors 16,16' are arranged symmetrically at an angle M with respect to a longitudinal axis 20 of the beam. Their ends 22,22' closest to axis 20, are spaced at a distance W11 from each other, said distance being equal to the width of central portion A.

As a result, mirror 16' intercepts a first lobe B, disposed below axis 20 and reflects above the axis as shown in FIG. 2 toward mirror 18. Similarly, mirror 16 intercepts second lobe C of the beam 10 and reflects it below axis 20 towards mirror 18'. Mirrors 18,18' are arranged to intercept the lobes from mirror 16,16' and transmit them in a superimposed relationship toward plane 12.

Mirror 18,18' are disposed at an angle N with respect to axis 20, and the lobes are directed towards plane 12 at an angle R which is related to angles M and N by the relationship $R=2(M-N)$.

Importantly, it is clear from FIG. 1 that the part of lobe B which initially is adjacent to the central portion A at $-W/2$ (Intensity $I_2$) ends up in plane 12 superimposed on the $Y=+W/2$ part of central portion A. Similarly, that part of lobe C, initially adjacent to portion A at $Y=+W/2$ ends up superimposed on the $Y=-W/2$ part of A in the plane 12.

Figure 2A:
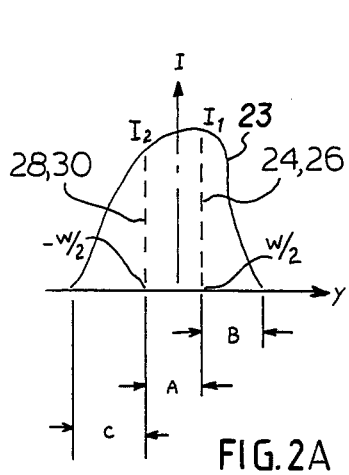
FIG. 2A shows a graph of the beam intensity with respect to a cross-sectional direction Y, taken along line 2A—2A of FIG. 1.
Figure 2B:
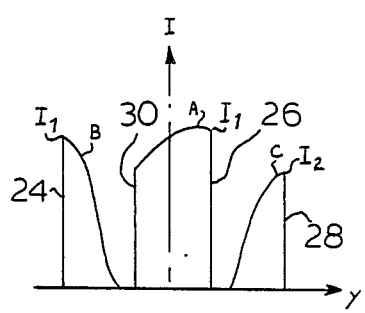
FIG. 2B shows a graph of the intensities of the central portion A, and lobes B and C taken along line 2B—2B of FIG. 1.
Figure 2C:
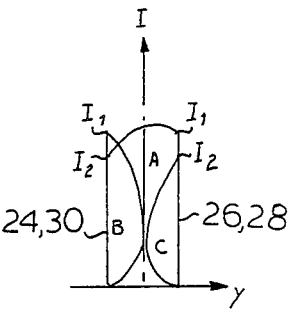
FIG. 2C shows how the apparatus of FIG. 1 superimposes lobes B and C on portion A, taken along line 2C—2C in FIG. 1.
Figure 2D:
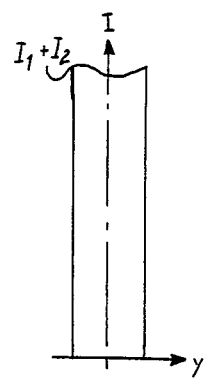
FIG. 2D shows the intensity distribution of the concentrated beam resulting from the superimposition of FIG. 2C.

This effect is illustrated more clearly in Figures 2A–C. Initially lobes B, C and central portion A form the continuous curve 23 seen in FIG. 2A. The curve is partitioned into three sections by the mirrors along lines at $Y=W/2$ and $Y=-W/2$. As previously mentioned, curve 23 has a value of $I_1$ and $I_2$ at these cuts respectively. After the reflections by mirrors 16,16' and 18,18', lobes B end up on the opposite side of portion A (FIG. 2B) with its maximum intensity point $I_1$ farthest from the beam axis. Thus while initially edge 24 of lobe B was adjacent to edge 26 of portion A at $Y=-W/2$, in FIG. 2B these edges are on opposite sides of the beam axis. Similarly, edges 28,30 are initially coextensive and adjacent in FIG. 2A at $Y=W/2$ but are on opposite sides of beam axis in FIG. 2B.

In plane 12, the lobes are superimposed on central portion A as shown in FIG. 2C so that edge 24 of lobe B ends up superimposed on edge 30, and edge 28 of lobe C ends up superimposed on edge 26 as shown. As a result of this superimposition, the concentrated beam shown in FIG. 2D has a higher intensity and is more uniform than the central portion A of the original beam.

Preferably the spacing W between mirror 16,16' is chosen so that about half of the energy of the laser beam is contained by the central portion A.

In the case of a linearly polarized highly spatially and temporally coherent incident laser beam, the final laser intensity profile on plane 12 could exhibit interference fringes. The depth of modulation and the separation between fringes are dependent on the degree of coherence, laser wavelength and angular separation between the folded beams. This effect can seriously degrade the beam uniformity and may not be acceptable for some applications.

Figure 3:
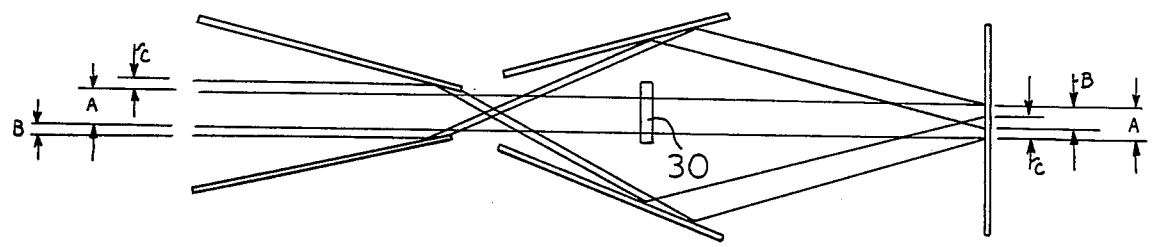
FIG. 3 shows a modification for the apparatus of FIG. 1.

To overcome this interference between folded components, a wave plate 30 with 90° polarization rotation (for example a half wave plate with its optical axis disposed at an angle of 45° with respect to the incident laser polarization) can be easily inserted into the path of the central portion A at a position where A is still spatially separated from lobes B and C as shown on FIG. 3. Thus the interference effects in the combined components (A and B or A and C) at the focus plane 12 are eliminated because of the orthogonal polarization between the superimposed components.

A somewhat simpler and more compact apparatus employing a trapezoidal prism can be constructed using the beam folding technique described above as shown in FIG. 4.

In this embodiment a prism 40 is interposed in the path of the beam 42 toward plane 44. The beam is partitioned into a central portion A and two side lobes B, C by the prism. The prism 40 consists of three flat surfaces on its incident face: a central surface 46 parallel to an exit surface 48 and two wedged surfaces 50, 52 located on either side of surface 46. The prism is aligned so that its parallel surfaces are normal to the incident beam. The lobes B and C of the incident beam converge by refraction toward the unchanged central portion A of the beam and fold onto A at the focus plane 12. The folding mechanism is similar to that of the four mirror system described above, i.e. the transition of the edges of the beam both sides to the opposite sides and the summing of their intensities into the central component of the beam. In this scheme, it is difficult to place a polarization rotation wave plate into the undeviated central component of the beam because the prism does not completely separate this part of the beam from the edges during the folding process, as is the case in the four-mirror scheme. This prism scheme may, therefore, be better suited for laser beams with low coherence i.e. highly multimoded laser outputs, in which interference effects are negligible.

Figure 4:
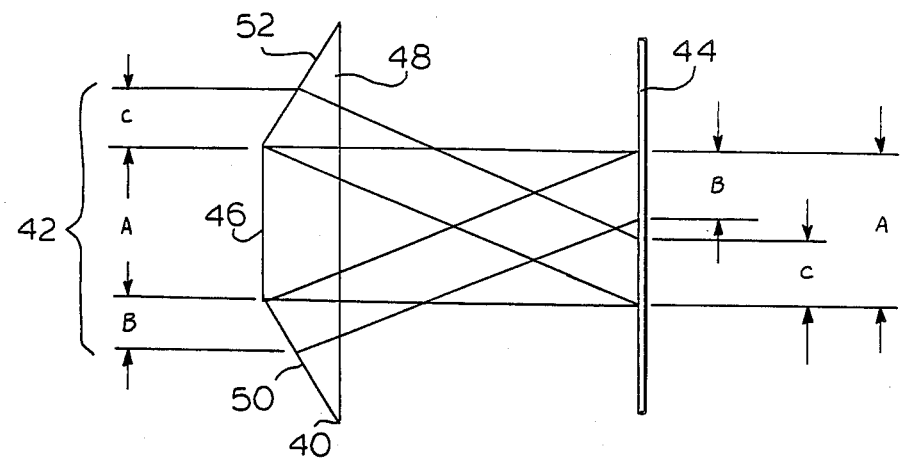
FIG. 4 shows an alternate embodiment of the invention.
Figure 5:
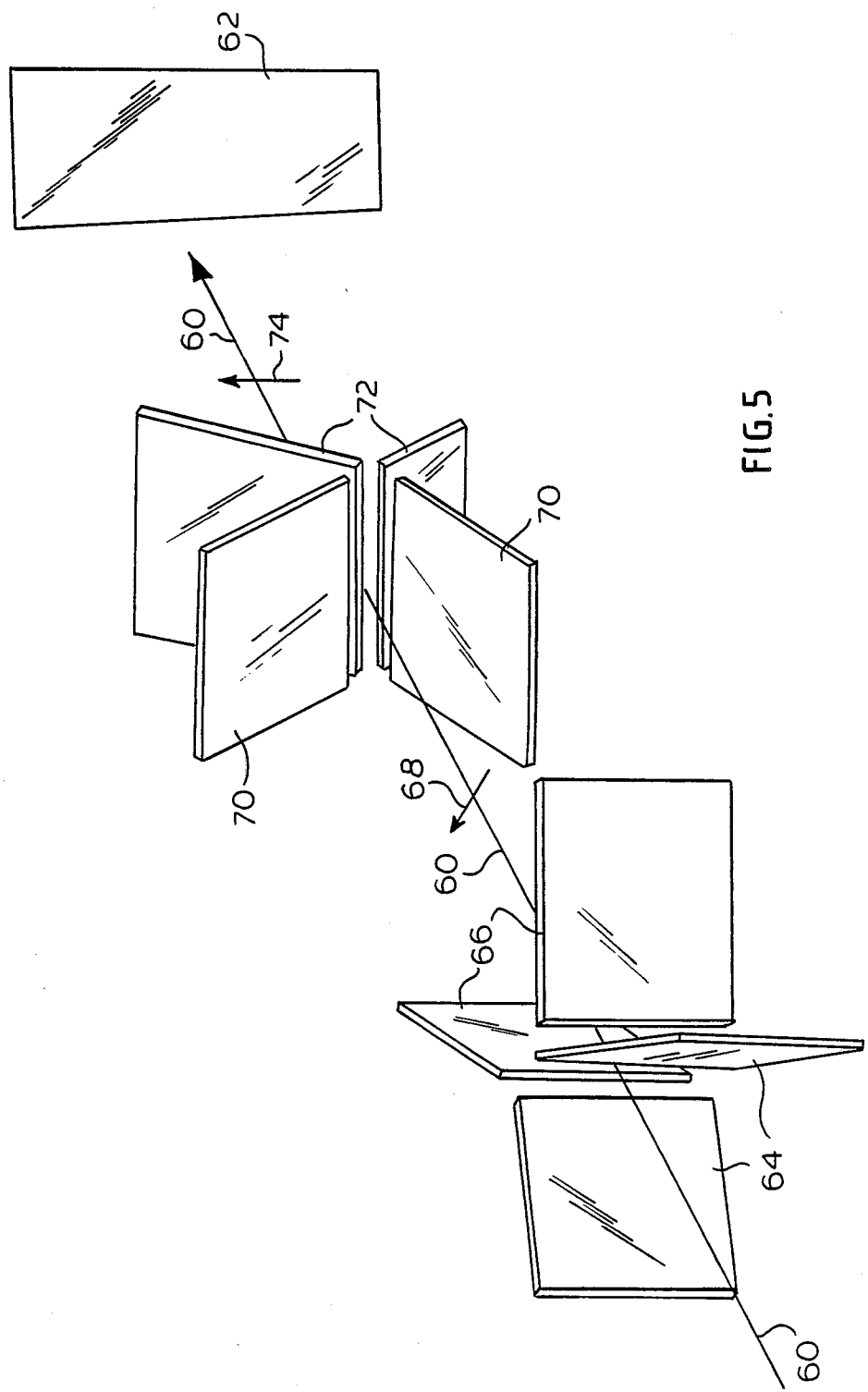
FIG. 5 shows an apparatus and method for folding a beam in two dimensions simultaneously.

The apparatus of FIGS. 1, 3 and 4 can fold a laser beam along one cross-sectional dimension. In FIG. 5 a method and device is shown for folding a beam along two cross-sectional dimensions. In said Figure numeral 60 shows the direction of travel of a beam toward a plane 62. For the sake of simplicity, the various lobes of the beam have been omitted.

A first pair of mirrors 64 cooperates with a second pair of mirrors 66 to fold the beam along a first cross-sectional direction 68. The lobes of the beams reflected by mirrors 64, 66 are superimposed on the beam central portion on plane 62. A third pair of mirrors 70 cooperates with a fourth pair 72 to fold the beam along a second cross-sectional direction 74. The lobes reflected by mirrors 70, 72 are also superimposed on the beam central portion on plane 62. In fact, mirror pairs 64, 66 and 70, 72 respectively perform the function shown in FIG. 1 but in two directions simultaneously. Preferably, directions 68 and 74 are orthogonal to each other.

Obviously, numerous modifications to the invention may be made without departing from the scope of the invention as defined in the appended claims.

I claim:

1. A method of concentrating a beam of coherent light having a cross-sectional intensity profile on a preselected plane comprising:

separating said beam into a central portion defined between first and second portion edges disposed transversely with respect to the beam, a first lobe having a first lobe edge initially adjacent to said first portion edge, and a second lobe having a second lobe edge initially adjacent to said second portion edge by intercepting said first and second lobes with a first pair of mirrors and directing the corresponding lobe across a longitudinal axis of the beam; and combining said central portion and first and second lobe into a concentrated beam with said first lobe edge superimposed on said second portion edge and said second lobe edge superimposed on said first second portion edge by way of a second pair of mirrors directing the first and second lobes toward the preselected plane.

2. The method of claim 1 wherein said concentrated beam has a cross-sectional dimension substantially equal to a cross-sectional dimension of said central portion.

3. A method of generating a concentrated beam of substantially uniform cross-section from a beam of non-uniform cross-section, at a preselected plane comprising:
  providing a first pair of planar mirrors disposed symmetrically about a longitudinal axis of the non-uniform beam, said first pair of mirrors being disposed at an angle M with respect to said axis and having inner mirror edges separated by a distance W, said distance W being smaller than the width of said non-uniform beam, whereby said first mirror pair partitions said non-uniform beam into a central portion and two side lobes; and
  providing a second pair of planar mirrors disposed symmetrically about said longitudinal axis at an angle N for directing said lobes at said preselected plane.

4. An apparatus for concentrating a beam of non-uniform cross-section on a preselected plane, said beam having a longitudinal axis, comprising:
  a first pair of mirrors disposed symmetrically about said axis thereby separating said beam into a central portion defined between a first and second portion edge spaced transversely about said axis, and first and second lobes having first and second edges respectively, said first pair of mirrors being arranged to reflect said lobes across said axis; and
  a second pair of mirrors disposed symmetrically about said axis for projecting the lobes from said first pair of mirrors to said plane thereby folding said lobes over said central portion at said preselected plane, with said first lobe edge being superimposed on said second portion edge, and said second lobe edge being superimposed on said first portion edge.

5. The apparatus of claim 4 wherein said first pair mirrors are disposed at an angle M with respect to the axis and said second pair of mirrors are disposed at an angle N with respect to said axis, said first and second pairs of mirrors cooperating to direct said lobes toward said plane at an angle R defined by $R=(M-N)2$.

6. The apparatus of claim 4 further comprising means for eliminating interference between the lobes and the central portion.

7. The apparatus of claim 6 wherein said beam is polarized and said eliminating means comprises polarization rotation means for rotating the polarization of said central portion by 90 degrees.

8. The apparatus of claim 7 wherein said rotating means comprises a wave plate disposed in a path of said central portion.

9. The apparatus of claim 8 wherein said wave plate is a half wave plate having an optical axis disposed at an angle of 45° with respect to the polarization of the beam whereby at said plane said central portion is polarized at 90° with respect to said lobes.

* * * * *